United States Patent
Kim et al.

(10) Patent No.: US 10,127,880 B2
(45) Date of Patent: Nov. 13, 2018

(54) LIQUID-CRYSTAL DISPLAY DEVICE HAVING CONTROL LINE GROUPS

(71) Applicant: Samsung Display Co. Ltd., Yongin-si (KR)

(72) Inventors: Hoon Kim, Ansan-si (KR); Sang Gyun Kim, Hwaseong-si (KR); Tae Jin Kong, Suwon-si (KR); Kyung Min Kim, Seoul (KR); Kyeong Jong Kim, Suwon-si (KR); Ki Chul Shin, Seongnam-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 81 days.

(21) Appl. No.: 15/180,220

(22) Filed: Jun. 13, 2016

(65) Prior Publication Data

US 2017/0076688 A1    Mar. 16, 2017

(30) Foreign Application Priority Data

Sep. 10, 2015   (KR) .................. 10-2015-0128402

(51) Int. Cl.
  *G09G 5/10*   (2006.01)
  *G09G 3/36*   (2006.01)
  (Continued)

(52) U.S. Cl.
  CPC ......... *G09G 3/3688* (2013.01); *G02F 1/1368* (2013.01); *G02F 1/13439* (2013.01);
  (Continued)

(58) Field of Classification Search
  CPC ...................................... G09G 3/3688
  (Continued)

(56) References Cited

U.S. PATENT DOCUMENTS

| 2006/0176265 | A1* | 8/2006 | Kim ..................... G09G 3/3648 345/100 |
| 2008/0048999 | A1* | 2/2008 | Chiang ................ G09G 3/3659 345/204 |

(Continued)

FOREIGN PATENT DOCUMENTS

| KR | 1020120128421 | 11/2012 |
| KR | 1020160127210 | 11/2016 |

*Primary Examiner* — Long D Pham
(74) *Attorney, Agent, or Firm* — Cantor Colburn LLP

(57) ABSTRACT

A liquid-crystal display device includes a display panel connected to first to $n^{th}$ gate lines and first to $n^{th}$ control lines, where n is a natural number greater than one, and a gate driving unit which sequentially applies first to $n^{th}$ gate signals having a first pulse width to the first to $n^{th}$ gate lines, respectively, for a unit frame, where the first to $n^{th}$ control lines are sorted into first to $k^{th}$ control line groups, where k is a natural number greater than one and less than n, the gate driving unit sequentially applies first to $k^{th}$ control signals having a second pulse width to the first to $k^{th}$ control line group, respectively, for the unit frame, and the first pulse width is smaller than the second pulse width.

18 Claims, 11 Drawing Sheets

(51) Int. Cl.
  *G02F 1/1335*    (2006.01)
  *G02F 1/1343*    (2006.01)
  *G02F 1/1368*    (2006.01)
  *G02F 1/1362*    (2006.01)
  *G02F 1/1333*    (2006.01)

(52) U.S. Cl.
  CPC .. *G02F 1/133512* (2013.01); *G02F 1/133514* (2013.01); *G02F 1/134309* (2013.01); *G02F 1/136286* (2013.01); *G09G 3/3677* (2013.01); *G02F 2001/133302* (2013.01); *G02F 2001/134345* (2013.01); *G02F 2001/136218* (2013.01); *G02F 2201/121* (2013.01); *G02F 2201/123* (2013.01); *G09G 3/3607* (2013.01); *G09G 2300/0426* (2013.01); *G09G 2320/0257* (2013.01)

(58) Field of Classification Search
  USPC .......................................................... 345/691
  See application file for complete search history.

(56) References Cited

U.S. PATENT DOCUMENTS

| | | | |
|---|---|---|---|
| 2016/0149494 A1* | 5/2016 | Li | H02M 3/1582 323/271 |
| 2016/0180785 A1* | 6/2016 | Jin | G09G 3/3614 345/87 |
| 2016/0313594 A1 | 10/2016 | Kim et al. | |

* cited by examiner

[FIG. 1]
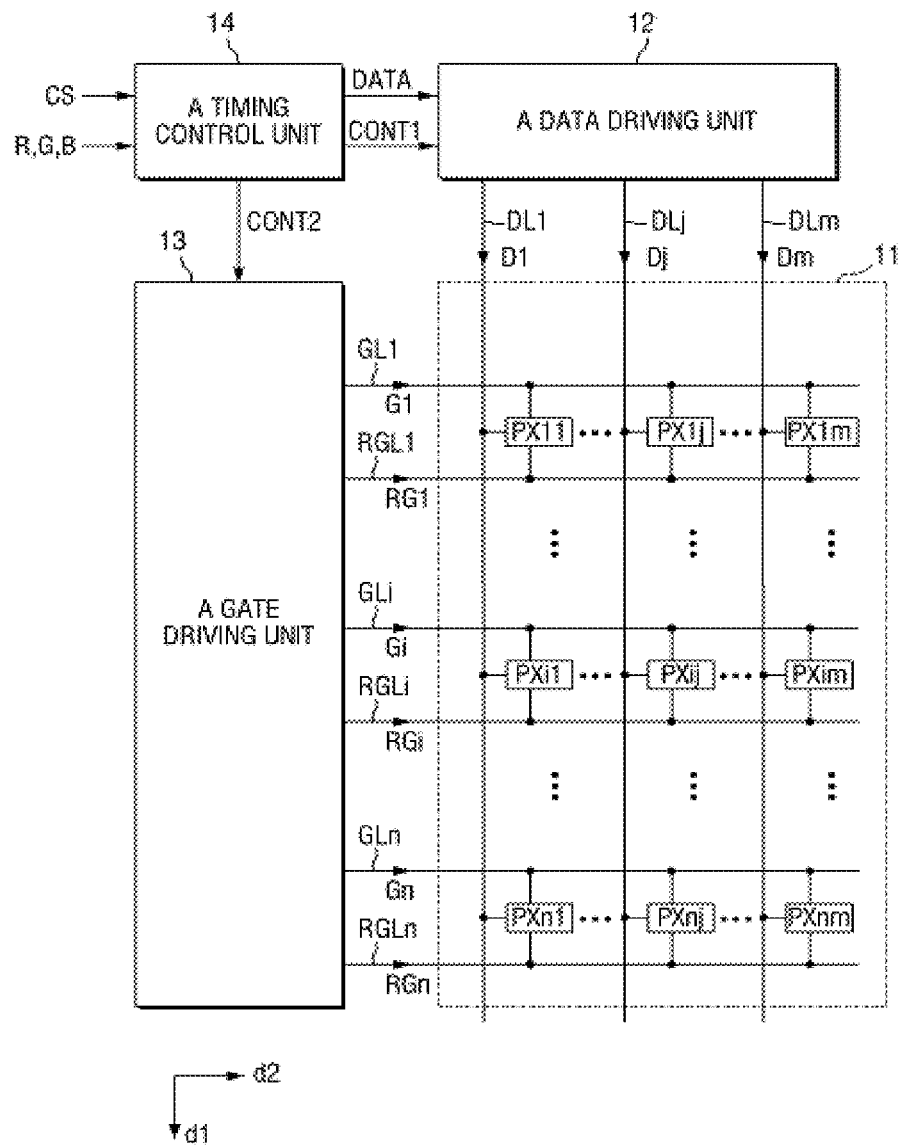

[FIG. 2]
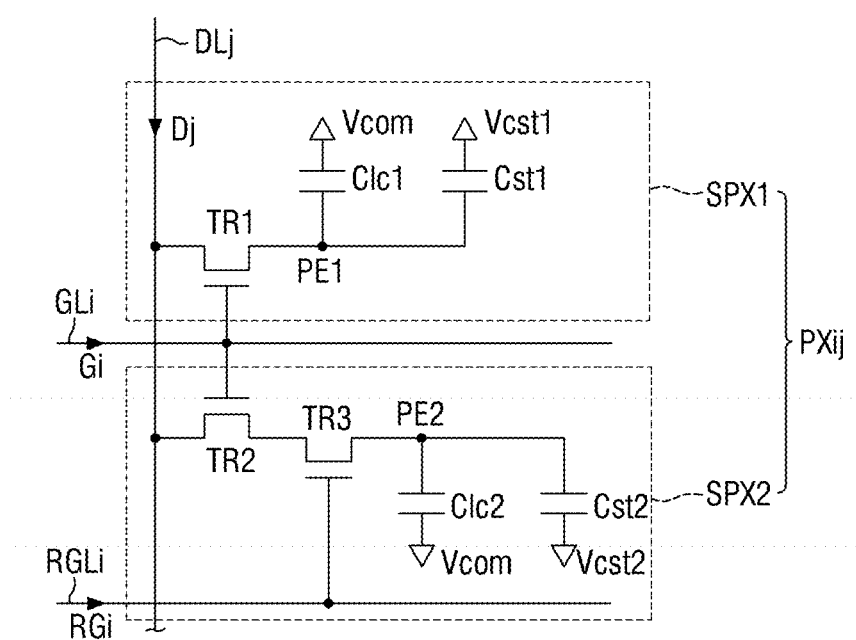

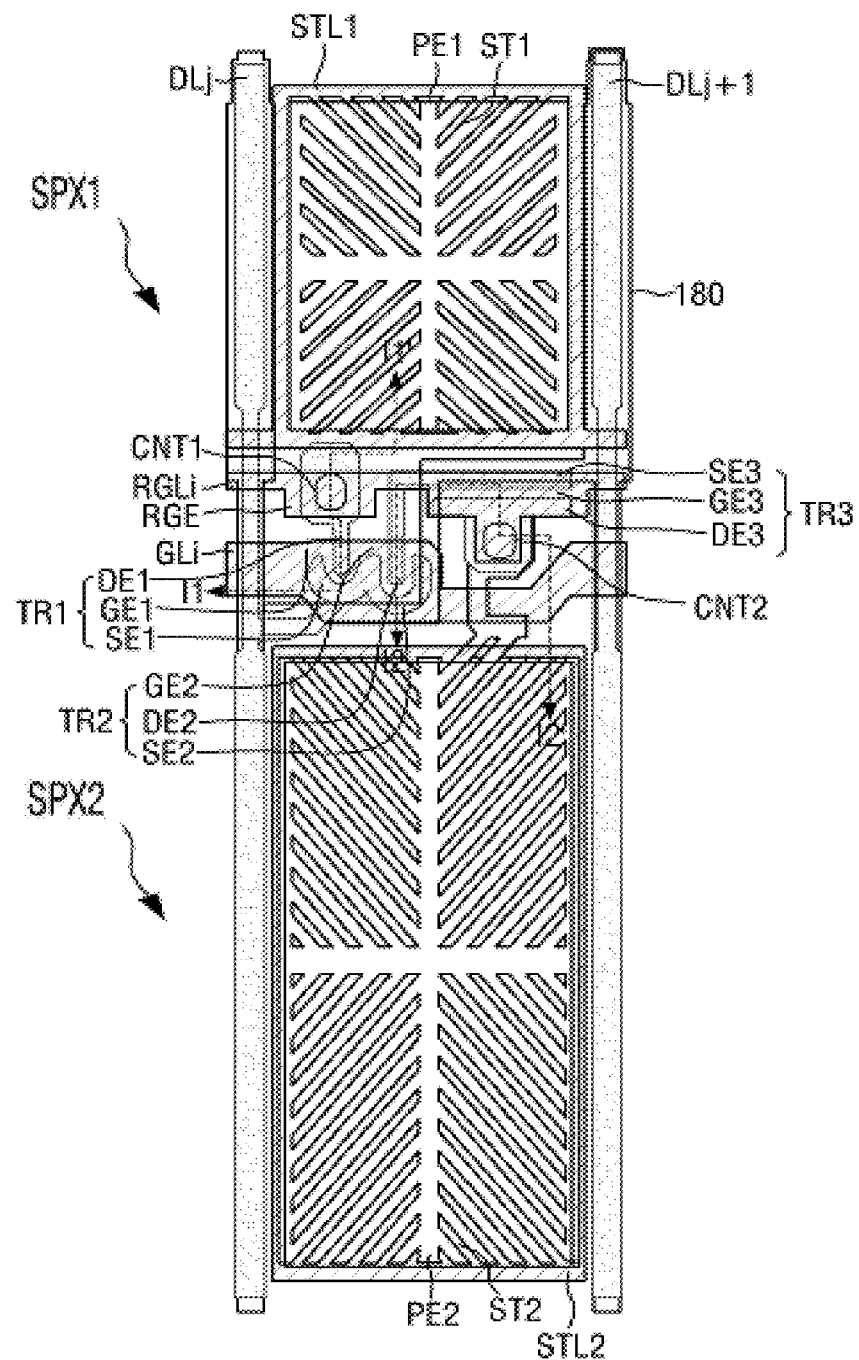
[FIG. 3]

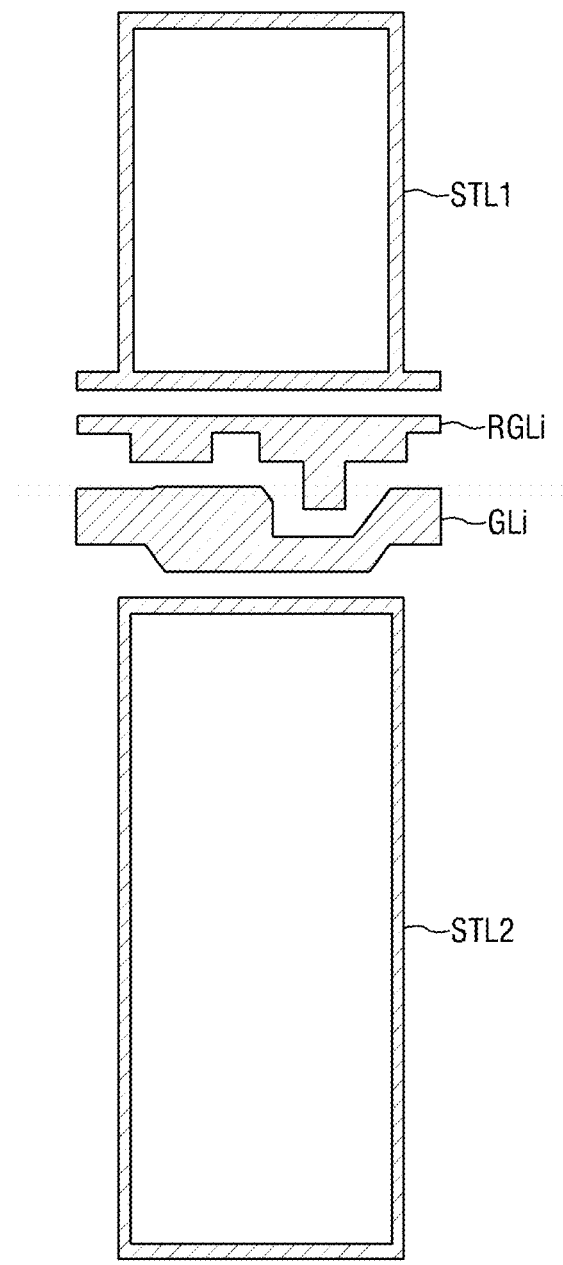
[FIG. 4]

[FIG. 5]
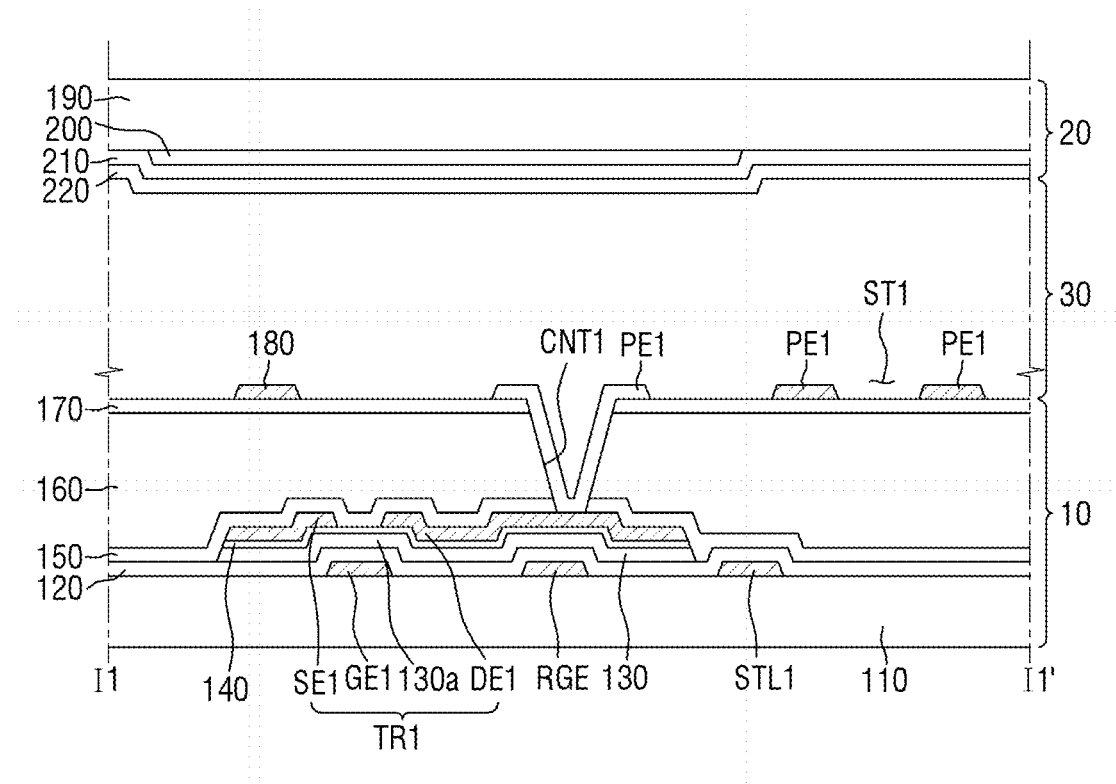

[FIG. 6]
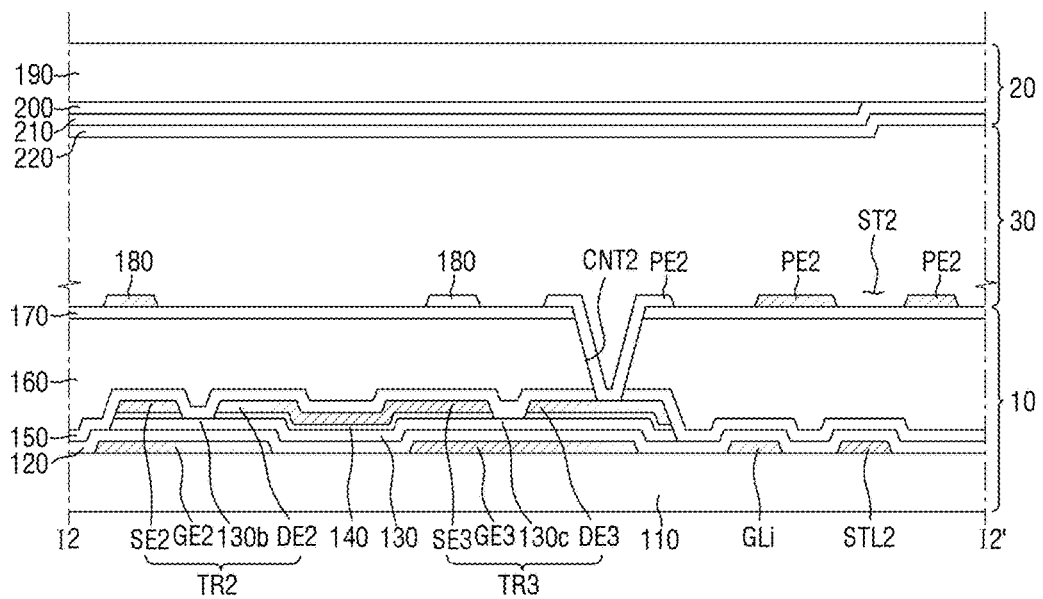

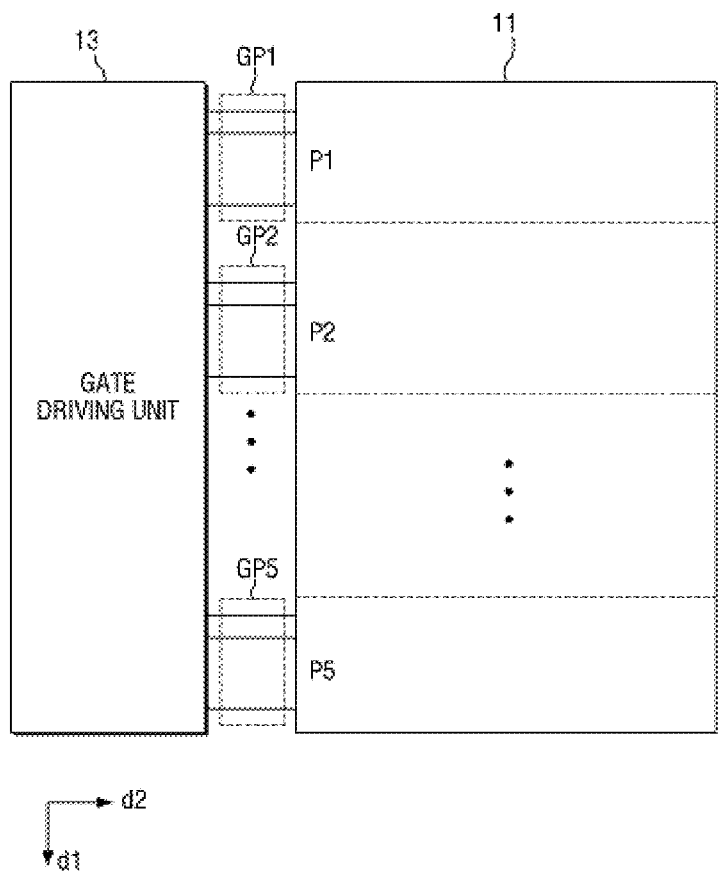
[FIG. 7]

[FIG. 8]
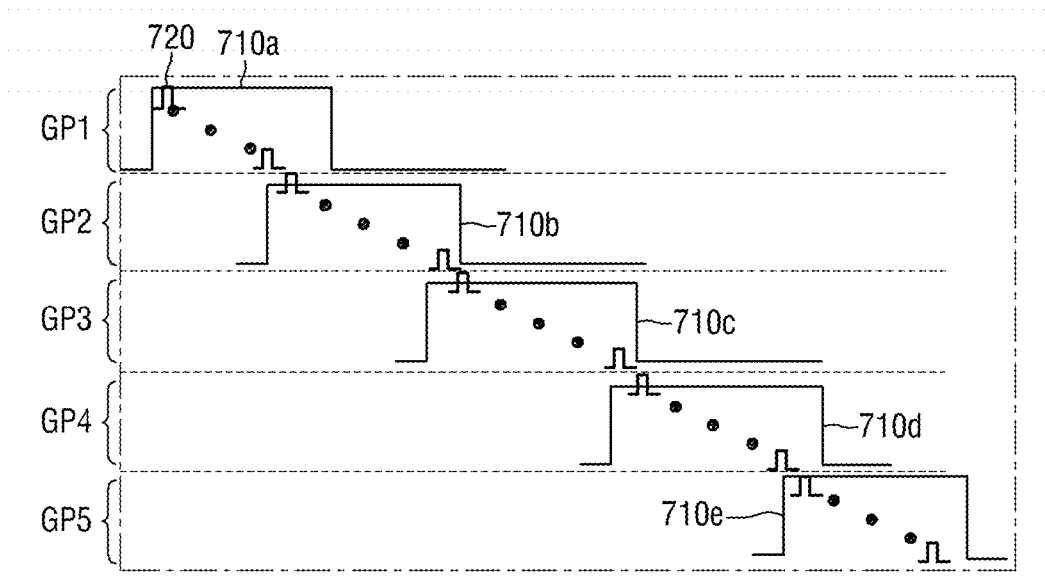

[FIG. 9]
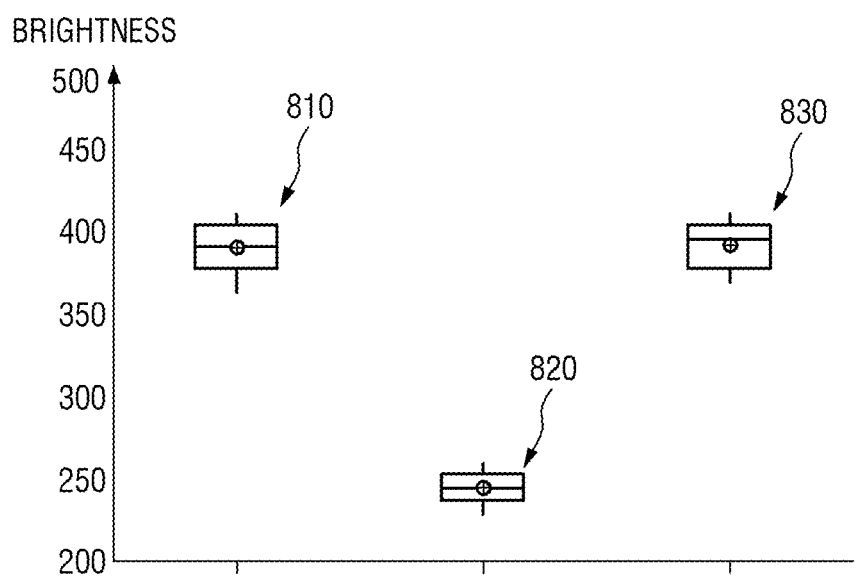

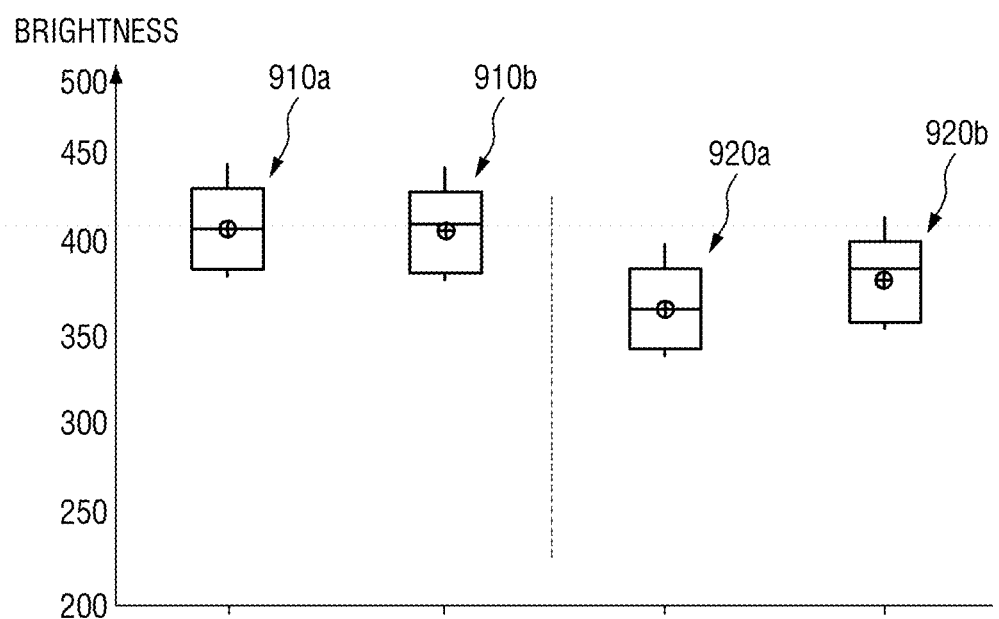
[FIG. 10]

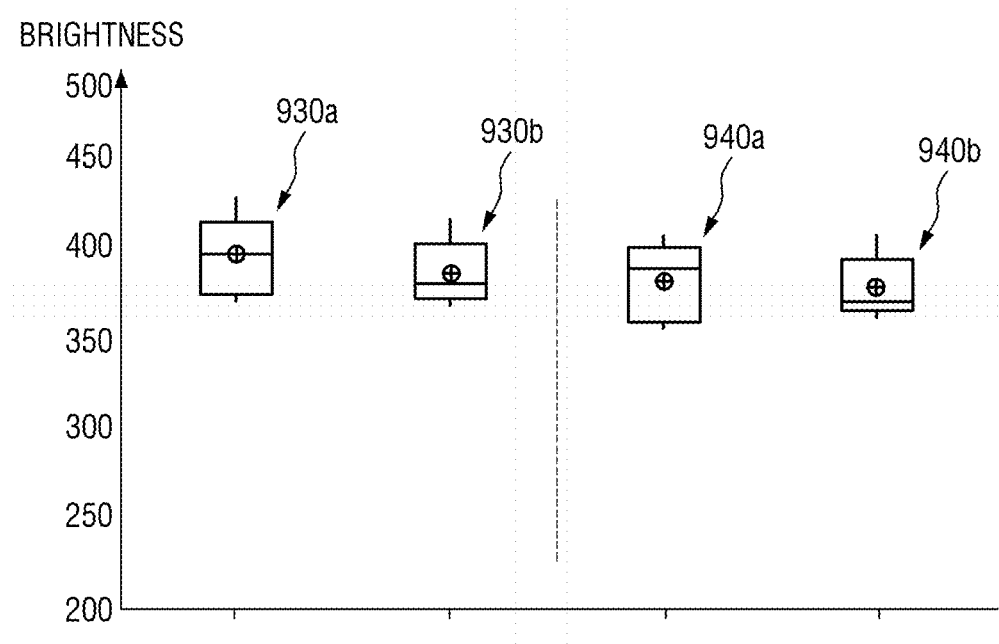
[FIG. 11]

LIQUID-CRYSTAL DISPLAY DEVICE HAVING CONTROL LINE GROUPS

This application claims priority to Korean Patent Application No. 10-2015-0128402, filed on Sep. 10, 2015, and all the benefits accruing therefrom under 35 U.S.C. § 119, the content of in its entirety is herein incorporated by reference.

BACKGROUND

1. Field

Exemplary embodiments of the invention relate to a liquid-crystal display device.

2. Description of the Related Art

A liquid-crystal display ("LCD") device is one of the most commonly used flat display devices. An LCD device generally includes two substrates on which field generating electrodes such as a pixel electrode and a common electrode are formed, and a liquid-crystal layer disposed therebetween. An LCD device displays an image in such a manner that a voltage is applied to field generating electrodes to generate an electric field across a liquid-crystal layer, and liquid-crystal molecules in the liquid-crystal layer are aligned by the electric field so as to control the polarization of incident light.

Among others, a vertically aligned ("VA") mode LCD is under development. In the VA mode LCD, liquid-crystal molecules are oriented such that their longer axes are perpendicular to the display substrate when no electric field is applied. A variety of structures of VA mode LCD devices are under development, including a structure in which a pixel is divided into two sub-pixels for better visibility when viewed from a side of the device.

SUMMARY

Exemplary embodiments of the invention provide a liquid-crystal display ("LCD") device capable of providing better visibility when viewed from a side of the device and improving an aperture ratio.

Exemplary embodiments of the invention also provide an LCD device capable of mitigating inverse afterimage.

It should be noted that objects of the invention are not limited to the above-described objects, and other objects of the invention will be apparent to those skilled in the art from the following descriptions.

According to exemplary embodiments of the invention, inverse afterimage phenomenon occurring in an LCD device may be mitigated.

Further, according to exemplary embodiments of the invention, visibility when viewed from a side of the device may be improved. In addition, no contact hole for dividing voltage is required, so that an aperture ratio may be increased.

An exemplary embodiment of the invention discloses a display panel connected to first to $n^{th}$ gate lines and first to $n^{th}$ control lines, where n is a natural number greater than one, and a gate driving unit configured to sequentially apply first to $n^{th}$ gate signals having a first pulse width to the first to $n^{th}$ gate lines, respectively, for a unit frame, where the first to $n^{th}$ control lines are sorted into first to $k^{th}$ control line groups, where k is a natural number greater than one and less than n, the gate driving unit is configured to sequentially apply first to $k^{th}$ control signals having a second pulse width to the first to $k^{th}$ control line group, respectively, for the unit frame, and the first pulse width is smaller than the second pulse width.

An exemplary embodiment of the invention also discloses a data driving unit connected to a plurality of data lines disposed in a first direction, a gate driving unit connected to a plurality of gate lines and a plurality of control lines disposed in a second direction different from the first direction and a display panel including a plurality of pixels each of having first and second sub-pixels, where the first sub-pixel includes a first switching element, a gate electrode of the first switching element being connected to an $i^{th}$ gate line of the plurality of gate lines, one electrode of the first switching element being connected to a $j^{th}$ data line of the plurality of data lines, and another electrode of the first switching element being connected to a first sub-pixel electrode, where i and j are natural numbers equal to or greater than one, the second sub-pixel includes a second switching element, a gate electrode of the second switching element being connected to the $i^{th}$ gate line and one electrode of the second switching element being connected to the $j^{th}$ data line, and a third switching element, a gate electrode of the third switching element being connected to the $i^{th}$ control line, one electrode of the third switching element being connected to the another electrode of the first switching electrode, and another electrode of the third switching element being connected to a second sub-pixel electrode, and where a duty cycle of an $i^{th}$ control signal provided from the $i^{th}$ control line ranges from 20% to 50%.

An exemplary embodiment of the invention also discloses a gate driving unit connected to first to $n^{th}$ gate lines and first to $k^{th}$ control lines, where n is a natural number greater than one and k is a natural number greater than one and less than n, a data driving unit connected to first to $m^{th}$ data lines, and a display panel including a plurality of pixels each connected to the respective first to $n^{th}$ gate lines, where the display panel is divided into first to $k^{th}$ display planes connected to the first to $k^{th}$ control lines, respectively, the gate driving unit is configured to sequentially apply gate signals to the first to $n^{th}$ gate lines, respectively, during a unit frame, and to sequentially apply control signals to the first to $k^{th}$ control lines, and a pulse width of the gate signals is different from a pulse width of the control signals.

BRIEF DESCRIPTION OF THE DRAWINGS

The above and other exemplary embodiments and features of the invention will become more apparent by describing in detail exemplary embodiments thereof with reference to the attached drawings, in which:

FIG. 1 is a block diagram of an exemplary embodiment of a liquid-crystal display ("LCD") device according to the invention;

FIG. 2 is an equivalent circuit diagram of an example of a pixel of the display panel shown in FIG. 1;

FIG. 3 is a view showing a plan view of the pixel shown in FIG. 2 in more detail;

FIG. 4 is a view showing only some of elements of the pixel shown in FIG. 3;

FIG. 5 is a cross-sectional view taken along line I1-I1' in FIG. 3;

FIG. 6 is a cross-sectional view taken along line I2-I2' in FIG. 3;

FIGS. 7 and 8 are diagrams for illustrating an exemplary embodiment of a method of driving an LCD device according to the invention; and FIGS. 9 to 11 are graphs for illustrating effects achieved by an exemplary embodiment of an LCD device according to the invention.

DETAILED DESCRIPTION

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram of a liquid-crystal display ("LCD") device according to an exemplary embodiment of the invention.

Referring to FIG. 1, the LCD device according to the exemplary embodiment may include a display panel 11, a data driving unit 12, a gate driving unit 13 and a timing control unit 14.

The display panel 11 displays an image thereon. The display panel 11 may include a lower display substrate 10, an upper display substrate 20 facing the lower display substrate 10, and a liquid-crystal layer 30 interposed therebetween (refer to FIG. 5). That is, the display panel 11 may be a liquid-crystal panel. The display panel 11 is connected to first to $n^{th}$ gate lines GL1 to GLn, first to $n^{th}$ control lines RGL1 to RGLn, and first to $m^{th}$ data lines DL1 to DLm, where n and m are natural numbers greater than one. The display panel 11 includes a plurality of pixels PX11 to PXnm, each of the pixels being connected to one of the first to $n^{th}$ gate lines GL1 to GLn, one of the first to $n^{th}$ control lines RGL1 to RGLn, and one of the first to $m^{th}$ data lines DL1 to DLm. The first to $n^{th}$ gate lines GL1 to GLn, the first to $n^{th}$ control lines RGL1 to RGLn, the first to $m^{th}$ data lines DL1 to DLm and the plurality of pixels PX11 to PXnm may be disposed on the lower display substrate 10 of the display panel 11. The lines are insulated from one another.

The plurality of pixels PX11 to PXnm may be arranged in a matrix, for example. The first to $m^{th}$ data lines DL1 to DLm may be extended in a first direction d1. The first to $n^{th}$ gate lines GL1 to GLn may be extended in a second direction d2 different from the first direction d1. The first to $n^{th}$ control lines RGL1 to RGLn may be extended in the second direction d2, like the first to $n^{th}$ gate lines GL1 to GLn. In FIG. 1, the first direction d1 is the column direction, and the second direction d2 is the row direction.

The data driving unit 12 may include a shift register, a latch, a digital-analog converter ("DAC"), etc. The data driving unit 12 may receive a first control signal CONT1 and image data DATA from the timing control unit 14. The data driving unit 12 may select a reference voltage in response to the first control signal CONT1 and may convert the received image data DATA in the form of a digital wave into first to $m^{th}$ data signals D1 to Dm based on the selected reference voltage. The data driving unit 12 may provide the generated first to $m^{th}$ data signals D1 to Dm to the display panel 11.

The gate driving unit 13 may receive a second control signal CONT2 from the timing control unit 14. The gate driving unit 13 may provide first to $n^{th}$ gate signals G1 to Gn and first to $n^{th}$ control signals RG1 to RGn to the display panel 11 in response to the received second control signal CONT2.

The timing control unit 14 may receive image signals R, G and B and a control signal CS for controlling them from an external device. In an exemplary embodiment, the control signal CS may include, for example, a vertical synchronization signal, a horizontal synchronous signal, a main clock signal and a data enable signal, etc. The timing control unit 14 may process the signals received from external devices so that the signals are suitable for the operating conditions of the display panel 11, and then may generate the image data DATA, the first control signal CONT1 and the second control signal CONT2. The first control signal CONT1 may include a horizontal synchronization signal to instruct to input the image data DADA and a load signal for controlling application of the plurality of data lines DL1 to DLm and the data voltages D1 to Dm, etc. The second control signal CONT2 may include a scan start signal to instruct to start outputting the first to $n^{th}$ gate signals G1 to Gn and first to $n^{th}$ control signals RG1 to RGn and a gate clock signal for controlling the output timing of a scan on pulse, etc.

Further, the LCD device according to the exemplary embodiment of the invention may further include a power supplying unit (not shown). The power supplying unit may supply an operating power to the LCD device according to the exemplary embodiment of the invention and may provide a common voltage Vcom to a common electrode 220 (refer to FIG. 5) via a common line (not shown).

Among the plurality of pixels PX11 to PXnm, a pixel PXij may be connected to the $i^{th}$ gate line GLi, the $i^{th}$ control line RGLi and the $j^{th}$ line DLj, where i is a natural number between one and n, and j is a natural number between one and m. This will be described below in more detail with reference to FIG. 2.

FIG. 2 is an equivalent circuit diagram of an example of a pixel PXij of the display panel 11 shown in FIG. 1.

The pixel PXij may include first and second sub-pixels SPX1 and SPX2. The first and second sub-pixels SPX1 and SPX2 may receive the $j^{th}$ data signal Dj to display an image based on different gamma curves or on the same gamma curve. That is, the first and second sub-pixels SPX1 and SPX2 may display image having different brightness for a single data signal to thereby improve visibility when viewed from a side of the device. The area of the first sub-pixel SPX1 may be equal to or different from the area of the second sub-pixel SPX2.

The first sub-pixel SPX1 may include a first switching element TR1, a first liquid-crystal capacitor Clc1 and a first storage capacitor Cst1.

The first switching element TR1 may be a transistor, for example. A gate electrode of the first switching element TR1 may be connected to the $i^{th}$ gate line GLi, one electrode of the first switching electrode TR1 may be connected to the $j^{th}$ data line DLj, and the other electrode of the first switching electrode TR1 may be connected to a first sub-pixel electrode PE1. The one electrode of the first switching element TR1 may be, for example, a source electrode and the other electrode thereof may be, for example, a drain electrode. The first liquid-crystal capacitor Clc1 may be disposed between the first sub-pixel electrode PE1 and the common electrode 220 (refer to FIG. 5). In addition, the first storage capacitor Cst1 may be disposed between the first sub-pixel electrode PE1 and a first storage line STL1 (refer to FIG. 3).

The first switching element TR1 may be turned on in response to the $i^{th}$ gate signal Gi received from the $i^{th}$ gate line GLi, and may provide the $j^{th}$ data signal Dj received from the $j^{th}$ data line DLj to the first sub-pixel electrode PE1. Accordingly, the first liquid-crystal capacitor Clc1 may be charged up to the difference between the voltage applied at the first sub-pixel electrode PE1 and the voltage Vcom at the common electrode 220 (refer to FIG. 5).

The second sub-pixel SPX2 may include a second switching element TR2, a third switching element TR3, a second liquid-crystal capacitor Clc2 and a second storage capacitor Cst2.

The second and third switching elements TR2 and TR3 may be transistors, for example. A gate electrode of the second switching element TR2 may be connected to the $i^{th}$ gate line GLi, one electrode of the second switching electrode TR2 may be connected to the $j^{th}$ data line DLj, and the other electrode of the second switching electrode TR2 may be connected to one electrode of the third switching element TR3. In an exemplary embodiment, the one electrode of the second switching element TR2 may be, for example, a source electrode, and the other electrode thereof may be, for example, a drain electrode. A gate electrode of the third switching element TR3 may be connected to the $i^{th}$ control line RGLi, one electrode of the third switching electrode TR3 may be connected to the other electrode of the second switching element TR2, and the other electrode of the third switching electrode TR3 may be connected to a second sub-pixel electrode PE2. In an exemplary embodiment, the one electrode of the third switching element TR3 may be, for example, a source electrode, and the other electrode thereof may be, for example, a drain electrode. The second liquid-crystal capacitor Clc2 may be disposed between the second sub-pixel electrode PE2 and the common electrode 220 (refer to FIG. 5). In addition, the second storage capacitor Cst2 may be disposed between the second sub-pixel electrode PE2 and a second storage line STL2 (refer to FIG. 3). In an exemplary embodiment, a first storage voltage Vcst1 in the form of a direct current ("DC") voltage may be applied to the first storage line STL1, for example. In an exemplary embodiment, a second storage voltage Vcst2 in the form of DC voltage may be applied to the second storage line STL2, for example. In an exemplary embodiment, the level of the first storage voltage Vcst1 may be equal to that of the second storage voltage Vcst2, for example.

The second switching element TR2 may be turned on in response to the $i^{th}$ gate signal Gi received from the $i^{th}$ gate line GLi, and may provide the $j^{th}$ data signal Dj received from the $j^{th}$ data line DLj to the one electrode of the third switching element TR3. The third switching element TR3 may be turned on in response to the $i^{th}$ control signal RGi received from the $i^{th}$ control line RGLi and may work like a resistor. In an exemplary embodiment, the on-resistance of the third switching element TR3 may be between about 0.1 mega-ohm (MΩ) and about 1,000 MΩ, for example.

That is, the voltage of the $j^{th}$ data signal Dj received from the second transistor element TR2 is dropped across the third switching element TR3 in proportion to the on-resistance and then is provided to the second sub-pixel electrode PE2. As a result, the level of the voltage applied to the second sub-pixel electrode PE2 may be lower than the level of the voltage applied to the first sub-pixel electrode PE1.

Accordingly, different voltages are applied to the first and second sub-pixel electrodes PE1 and PE2 of the pixel PXij, respectively, such that an angle at which the liquid-crystal molecules in the first sub-pixel SPX1 are oriented is different from an angle at which the liquid-crystal molecules in the second sub-pixel SPX2 are oriented.

In addition, in the LCD device according to the exemplary embodiment of the invention, no additional contact hole for applying a dividing voltage to a switching element for voltage dividing is required. As a result, the LCD device according to the exemplary embodiment of the invention may achieve a higher aperture ratio.

FIG. 3 is a plan view of the pixel PXij shown in FIG. 2 in more detail. FIG. 4 is a view showing only some of elements of the pixel PXij shown in FIG. 3. FIG. 5 is a cross-sectional view taken along line I1-I1' of FIG. 3. FIG. 6 is a cross-sectional view taken along line I2-I2' of FIG. 3.

The pixel PXij of the elements of the LCD device according to the exemplary embodiment of the invention will be described in more detail with reference to FIGS. 3 to 6. The LCD device according to the exemplary embodiment of the invention may include a lower display substrate 10, an upper display substrate 20 and a liquid-crystal layer 30 interposed therebetween. The lower display substrate 10 may face the upper display substrate 20. In an exemplary embodiment, the lower display substrate 10 and the upper display substrate 20 may be attached to each other and sealed together, for example.

The lower substrate 10 will be described first.

In an exemplary embodiment, the lower substrate 110 may be, for example, a transparent glass substrate or a plastic substrate, and may be an array substrate on which a plurality of switching elements is disposed. An $i^{th}$ gate line GLi, an $i^{th}$ control line RGLi, a first storage line STL1 and a second storage line STL2 may be disposed on the lower substrate 100. Specifically, referring to FIG. 4, the $i^{th}$ gate line GLi, the $i^{th}$ control line RGLi, the first storage line STL1 and the second storage line STL2 may be disposed on the same layer. The $i^{th}$ gate line GLi may include first and second gate electrodes GE1 and GE2. The $i^{th}$ control line RGLi may include a third gate electrode GE3 and a control line electrode RGE protruding toward the $i^{th}$ gate line GLi in a plan view.

More specifically, the first gate electrode GE1 may protrude or be expanded from the $i^{th}$ gate line GLi toward a first semiconductor pattern 130a. The second gate electrode GE2 may protrude or be expanded from the $i^{th}$ gate line GLi toward a second semiconductor pattern 130b. In addition, the third gate electrode GE3 may protrude or be expanded from the $i^{th}$ control line RGLi toward a third semiconductor pattern 130c. The first storage line STL1 may be disposed above the $i^{th}$ gate line GLi in FIG. 3. The second storage line STL2 may be disposed below the $i^{th}$ gate line GLi in FIG. 3. The first and second storage lines STL1 and ST12 may be electrically connected to each other. Accordingly, the storage voltages Vcst1 and Vcst2 (refer to FIG. 2) having the same voltage level may be provided to the storage lines.

In an exemplary embodiment, the $i^{th}$ gate line GLi, the $i^{th}$ control line RGLi, the first storage line STL1 and the second storage line STL2 may be provided as a single-layer, a double-layer or a triple-layer including a conductive metal including at least one of aluminum (Al), copper (Cu), molybdenum (Mo), chrome (Cr), titanium (Ti), tungsten (W), molybdenum-tungsten (MoW), molybdenum-titanium (MoTi) and copper/molybdenum-titanium (Cu/MoTi), for example.

The gate insulation film 120 may be disposed on the $i^{th}$ gate line GLi, the $i^{th}$ control line RGLi, the first storage line STL1 and the second storage line STL2. In an exemplary embodiment, the gate insulation film 120 may include, for example, silicon nitride (SiNx) or silicon oxide (SiOx), for example. In an exemplary embodiment, the gate insulation film 120 may have a multi-layer structure including two insulation layers having different physical properties, for example.

In an exemplary embodiment, the semiconductor layer 130 may be disposed on the gate insulation film 120 and may include, for example, amorphous silicon, polycrystalline silicon, etc., for example. A part of the semiconductor layer 130 may overlap the $j^{th}$ data line DLj. In addition, in an embodiment where the plurality of data lines, the first to third source electrodes SE1, SE2 and SE3, the first to third drain electrodes DE1, DE2 and DE3 and the semiconductor layer 130 are provided together via the same process using a single mask, the semiconductor layer 130 may be disposed under the elements. That is, the semiconductor layer 130 may have substantially the same shape as the plurality of dada lines, except a channel region. The semiconductor layer 130 may include a first semiconductor pattern 130a providing a first switching element TR1, a second semiconductor pattern 130b providing a second switching element TR2, and a third semiconductor pattern 130c providing a third switching element TR3. At least a part of the first semiconductor pattern 130a overlaps the first gate electrode GE1. At least a part of the second semiconductor pattern 130b overlaps the second gate electrode GE2. At least a part of the third semiconductor pattern 130c overlaps the third gate electrode GE3.

An ohmic contact layer 140 may be disposed on the semiconductor layer 130. In an exemplary embodiment, the ohmic contact layer 140 may include a material highly doped with an n-type impurity such as phosphorus, e.g., n+ hydrogenated amorphous silicon, or may include silicide.

The $j^{th}$ data line DLj, the $(j+1)^{th}$ data line DLj+1, the first to third source electrodes SE1, SE2 and SE3, the first to third drain electrodes DE1, DE2 and DE3 may be disposed on the ohmic contact layer 140. The first switching element TR1 may include a first source electrode SE1, a first drain electrode DE1, a first semiconductor pattern 130a and a first gate electrode GE1. The first source electrode SE1 may be connected to the $j^{th}$ data line DLj to receive the $j^{th}$ data signal Dj. The first drain electrode DE1 may be electrically connected to the first sub-pixel electrode PE1 via a first contact hole CNT1. A part of each of the first source electrode SE1 and the first drain electrode DE1 may overlap the first gate electrode GE1. The first source electrode SE1 and the first drain electrode DE1 may be disposed on the first semiconductor pattern 130a and the ohmic contact layer 140 spaced apart from each other by a predetermined distance.

The second switching element TR2 may include a second source electrode SE2, a second drain electrode DE2, a second semiconductor pattern 130a and a second gate electrode GE2. The second source electrode SE2 may be connected to the $j^{th}$ data line DLj to receive the $j^{th}$ data signal Dj. The second drain electrode DE2 may be electrically connected to the source electrode SE3 of the third switching element TR3. A part of each of the second source electrode SE2 and the second drain electrode DE2 may overlap the second gate electrode GE2. The second source electrode SE2 and the second drain electrode DE2 may be disposed on the second semiconductor pattern 130b and the ohmic contact layer 140 spaced apart from each other by a predetermined distance.

The third switching element TR3 may include a third source electrode SE3, a third drain electrode DE3, a third semiconductor pattern 130c and a third gate electrode GE3. The third source electrode SE3 may be connected to second drain electrode DE2 of the second switching element TR2 to receive the $j^{th}$ data signal Dj from the second switching element TR2. The third drain electrode DE3 may be electrically connected to the second sub-pixel electrode PE2 via a second contact hole CNT2. A part of each of the third source electrode SE3 and the third drain electrode DE3 may overlap the third gate electrode GE3. The third source electrode SE3 and the third drain electrode DE3 may be disposed on the third semiconductor pattern 130c and the ohmic contact layer 140 spaced apart from each other by a predetermined distance.

Accordingly, the first sub-pixel SPX1 may receive the $j^{th}$ data signal Dj via the first source electrode SE1 and may apply the $j^{th}$ data signal Dj to the first sub-pixel electrode PE1 via the first drain electrode DE1 and the first contact hole CNT1. The second sub-pixel SPX2 may provide the $j^{th}$ data signal Dj received via the second source electrode SE2 of the second switching element TR2 to the third source electrode SE3 of the third switching element TR3. In addition, the third switching element TR3 may apply the $j^{th}$ data signal Dj received via a switching operation to the second sub-pixel electrode PE2 via the second contact hole CNT2 of the third drain electrode DE3. In this regard, the voltage of the $j^{th}$ data signal Dj is dropped when the third switching element TR3 performs a switching operation due to the on-resistance of the third switching element TR3. As a result, even though the same voltage of the $j^{th}$ data signal Dj is applied to the first and second sub-pixels SPX1 and SPX3, voltages of different levels are applied to the sub-pixel electrodes PE1 and PE2. That is, as the level of the voltage applied to the first sub-pixel electrode PE1 is higher than that of the second sub-pixel electrode PE2, an angle at which the liquid-crystal molecules in the first sub-pixel SPX1 are oriented is different from an angle at which the liquid-crystal molecules in the second sub-pixel SPX2 are oriented.

Accordingly, in the LCD device according to the exemplary embodiment of the invention, even when a pixel receives a single data signal, different voltages are applied to sub-pixel electrodes, and thus visibility when viewed from a side of the device may be improved. In addition, no additional contact hole for dividing voltage is required, and thus the aperture ratio of the device may be increased.

Unlike the first and second switching elements TR1 and TR2, the third switching element TR3 is electrically connected to the $i^{th}$ control line RGLi. The $i^{th}$ gate signal Gi provided from the $i^{th}$ gate line GLi may have a pulse width different from that of the $i^{th}$ control signal RGi provided from the $i^{th}$ control line RGLi. A description thereof will be made below with reference to FIGS. 7 and 8.

In an exemplary embodiment, the $j^{th}$ data line DLj, the $(j+1)^{th}$ data line DLj+1, the first to third source electrodes SE1, SE2 and SE3 and the first to third drain electrodes DE1, DE2 and DE3 may be provided as a single-layer, a double-layer or a triple-layer including a conductive metal including aluminum (Al), copper (Cu), molybdenum (Mo), chrome (Cr), titanium (Ti), tungsten (W), molybdenum-tungsten (MoW), molybdenum-titanium (MoTi), and copper/molybdenum-titanium (Cu/MoTi). However, the material for the lines and electrodes are not limited to those listed above but may include a variety of metals or conductors.

The first passivation film 150 may be disposed on the $j^{th}$ data line DLj, the $(j+1)^{th}$ data line DLj+1, the first to third source electrodes SE1, SE2 and SE3, the first to third drain electrodes DE1, DE2 and DE3, and the gate insulation film 120. In an exemplary embodiment, the first passivation film 150 may include an inorganic insulating material such as silicon nitride or silicon oxide, for example. The first passivation film 150 may prevent a pigment of a color filter 160 disposed on the first passivation film 150 from being introduced into exposed portions of the semiconductor.

The color filter 160 may be disposed on the first passivation film 150. The color filter 160 may allow one of the primary colors such as three primary colors including red, green and blue, etc., to be produced, for example. The color filter 160 of a pixel may include a material different from that of the next pixel so that they allow different colors to be produced.

A second passivation film 170 may be disposed on the color filter 160. The second passivation film 170 may include an inorganic insulating material such as silicon nitride and silicon oxide, or an organic insulating material. The second passivation film 170 is to prevent the color filter 160 from coming off the underlying layer, and to suppress the liquid-crystal layer 30 from being contaminated by an organic material such as a solvent introduced from the color filter 160, so that defects such as image sticking possibly occurring on the screen may be avoided.

The first sub-pixel electrode PE1 may be disposed on the second passivation film 170 and may be electrically connected to the first drain electrode DE1 exposed via a first contact hole CNT1. The second sub-pixel electrode PE2 may be disposed on the second passivation film 170 and may be electrically connected to the third drain electrode DE3 exposed via a second contact hole CNT2. In an exemplary embodiment, the first and second sub-pixel electrodes PE1 and PE2 may include a transparent conductive material such as ITO and IZO, or may include a reflective metal such as aluminum, silver, chrome or an alloy thereof.

In an exemplary embodiment, a plurality of first slits ST1 may be defined in the first sub-pixel electrode PE1, for example. In an exemplary embodiment, a plurality of second slits ST2 may be defined in the second sub-pixel electrode PE2, for example. For the first sub-pixel electrode PE1, the first slits ST1 may generate fringe field between the first sub-pixel electrode PE1 and a common electrode 220 to be described below, so that liquid-crystal molecules in the liquid-crystal layer 30 may be rotated in a particular direction. In an exemplary embodiment, the first and second sub-pixel electrodes PE1 and PE2 may have a generally quadrangular shape, and may include crossing branches having a plurality of horizontal branches and a plurality of vertical branches intersecting one another, for example.

A shielding electrode 180 may be disposed on the second passivation film 170. That is, the shielding electrode 180 may be disposed on the same layer where the first and second sub-pixel electrodes PE1 and PE2 are disposed. The shielding electrode 180 may receive the same voltage as the common Vcom applied to the common electrode 220. The shield electrode 180 may overlap a plurality of data lines and thus it may prevent light leakage due to coupling between the plurality of data lines and pixel electrodes adjacent thereto. In an exemplary embodiment, the shield electrode may include a transparent conductive material such as ITO and IZO, or including a reflective metal such as aluminum, silver, chrome or an alloy thereof.

In an exemplary embodiment, the upper substrate 190 may include a transparent glass or a plastic. A light-blocking member 200, also referred to as a black matrix, may be disposed on the upper substrate 190 for blocking light leakage. An overcoat layer 210 may be disposed on the upper substrate 190 and the light-blocking member 200. The overcoat layer 210 may include an insulating material and may be eliminated in some implementations.

The common electrode 220 may be disposed on the overcoat layer 210. At least a part of the common electrode 220 may overlap the first and second sub-pixel electrodes PE1 and PE2. When the $j^{th}$ data signal Dj is applied to the first sub-pixel electrode PE1 by the switching operation of the first switching element TR1 while the common voltage Vcom (refer to FIG. 2) is applied to the common electrode 220, an electric field may be generated between the first sub-pixel electrode PE1 and the common electrode 220. The generated electric field causes the liquid-crystal molecules in the liquid-crystal layer 30 to be oriented. Similarly, an electric field may be generated between the second sub-pixel electrode PE2 and the common electrode 220. However, as described above, the level of the voltage applied to the second sub-pixel electrode PE2 is lower than that of the first sub-pixel electrode PE1, and thus the liquid-crystal molecules located between the second sub-pixel electrode PE2 and the common electrode 220 are oriented at an angle different from an angle at which the liquid-crystal molecules located between the first sub-pixel electrode PE1 and the common electrode 220 are oriented. As a result, according to the exemplary embodiment of the invention, the LCD device may have improved visibility when viewed from a side of the device even with no additional contact hole for dividing voltage.

Hereinafter, a method of driving an LCD device according to an exemplary embodiment of the invention will be described with reference to FIGS. 7 and 8.

FIGS. 7 and 8 are diagrams for illustrating a method of driving an LCD device according to an exemplary embodiment of the invention. It is to be noted that the first to $n^{th}$ gate lines GL1 to GLn, the first to $m^{th}$ data lines DL1 to DLm, the data driving unit 12 and the timing control unit 14 are not shown in FIG. 7 for convenience. In FIG. 8, gate signals are collectively referred to as "gate signals 720" for convenience of illustration.

Referring to FIGS. 1 and 7, a plurality of control lines may be sorted into first to $k^{th}$ control line groups, where k is a natural number greater than 1 and less than n. In the following descriptions, it is assumed that k is 5. The plurality of control lines may be sorted into the first to fifth control line groups GP1 to GP5. A display panel 11 may include a plurality of display planes. The number of the display planes may be equal to the number of the control line groups. Accordingly, the display panel 11 may include first to first display planes P1 to P5, for example.

The first display plane P1 may be connected to the gate driving unit 13 via a plurality of control lines belonging to the first control line group GP1. The second display plane P2 may be connected to the gate driving unit 13 via a plurality of control lines belonging to the second control line group GP2. Similarly, the third to fifth display planes P3 to P5 may be connected to the gate driving unit 13 via the third to fifth control line groups GP3 to GP5, respectively.

Referring to FIGS. 7 and 8, the gate driving unit 13 may apply a control signal having the same duty cycle to every control line of each of the control line groups GP1 to GP5 for a unit frame. That is, all of the control lines of the same control line group may receive control signals having the same cycle. The unit frame refers to a time period allocated for displaying a frame. In an exemplary embodiment, when a frame frequency is about 60 Hertz (Hz), the unit frame is approximately 16.6 milliseconds (msec), for example.

The gate driving unit 13 may sequentially apply first to fifth control signals 710a to 710e to the first to fifth control line signals GP1 to GP5, respectively. One of the first to fifth control signals 710a to 710e may overlap another one. More specifically, the gate driving unit 13 may apply the first control signal 710a to a plurality of pixels located in the first display plane P1 via the plurality of control lines belonging to the first control line group GP1. Then, before the transition of the first control signal 710a from High to Low, the gate driving unit 13 may apply the second control signal 710b to a plurality of pixels located in the second display plane P2 via the plurality of control lines belonging to the second control line group GP2. As a result, the first and second control signals 710a and 710b overlap each other. Likewise, the gate driving unit 13 may sequentially apply the third to fifth control signals 710c to 710e to the third to fifth display planes P3 to P5, respectively. As a result, the third control signal 710c may overlap the fourth control signal 710d, and the fourth control signal 710d may overlap the fifth control signal 710e.

The gate driving unit 13 may sequentially apply first to $n^{th}$ gate signals G1 to Gn to the first to $n^{th}$ control lines GL1 to GLn, respectively, for the unit frame. That is, the gate driving unit 13 may sequentially apply the first to fifth control signals 710a to 710e to the first to fifth display planes P1 to P5, respectively, and also sequentially apply the first to $n^{th}$ gate signals G1 to Gn to the display panel 110.

The pulse width of the first to fifth control signals 710a to 710e may be larger than that of the first to $n^{th}$ gate signals G1 to Gn. Accordingly, the third switching element TR3 of each of the plurality of pixels located in the first display plane P1 may remain turned on until a predetermined time point after the second control signal 710b is provided to the second display plane P2.

That is, the third switching element TR3 (referring to FIGS. 2 and 3) of each of the pixels may be turned on before the first and second switching elements TR1 and TR2 (referring to FIGS. 2 and 3) in the same pixel are turned on. In addition, the third switching element TR3 of each of the pixels may remain turned on even when the first and second switching elements TR1 and TR2 in the same pixel are turned off until a predetermined time point after a control signal is provided to the next display plane. Since five control signals are applied to the display panel 11 for the unit frame, the third switching element TR3 receives a control signal in the form of DC voltage having the duty cycle of 20%.

The duty cycle (Ton/Tframe) may range from about 0.001% to about 100%, and preferably from 20% to 25%. Herein, "Ton" denotes a time period during which the third switching element TR3 is turned on, and Tframe denotes the unit frame.

If a control signal having the duty cycle of 100% is applied to the gate electrode GE3 of the third switching element TR3 from the gate driving unit 13, inverse afterimage may occur. The inverse afterimage refers to a phenomenon that a white region and a black region are reversed in a gray level. That is, the inverse afterimage refers to the phenomenon that a white region looks darker than a black region or a black region looks brighter than a white region. Such inverse afterimage may be resulted from a change in the resistance of the third semiconductor pattern 103c (refer to FIG. 5) of the third switching element TR3. That is, the third switching element TR3 receives a control having the duty cycle of 100%, i.e., a control signal in the form of DC voltage, such that it remains turned on during the unit frame. Accordingly, the resistance component of the third semiconductor pattern 130c may increase due to a reduction in the amount of current in DC bias period (charge trap). The increase in the resistance component makes a white region larger than a black region, resulting image sticking.

In contrast, according to the exemplary embodiment of the invention, the control signal is not a DC voltage but has a predetermined duty cycle, so that inverse afterimage may be mitigated.

That is, the gate driving unit 13 applies a control signal having a predetermined duty cycle to the third switching element TR3 of each of the pixels. Accordingly, the third switching element TR3 is turned off when the level of the control signal is Low. As a result, according to the exemplary embodiment of the invention, the time period for which the third switching element TR3 is turned on may be reduced, so that an increase in the resistance component of the third semiconductor pattern 130c may be mitigated. In an exemplary embodiment, the predetermined duty cycle may range, for example, from about 20% to about 25%.

In this regard, the number of the control line groups into which the plurality of control lines is sorted may vary depending on the duty cycle. As described above with respect to FIG. 8, in the LCD device according to the exemplary embodiment of the invention, the first to $n^{th}$ control lines RGL1 to RGLn are sorted into the five control line groups GP1 to GP5, and the third switching element TR3 of each of the pixels receives a control signal having the duty cycle of about 20%. As a result, an increase in the resistance component of the third semiconductor pattern 130c of the third switching element TR3 may be suppressed, so that the inverse afterimage may be mitigated.

In addition, according to the exemplary embodiment of the invention, the LCD device may increase signal stability by allowing each of the first the fifth control signals 710a to 710e to overlap the next one.

Although not shown in the drawings, the gate driving unit 13 may be divided into a first driving unit sequentially apply the first to $n^{th}$ gate signals G1 to Gn to the first to $n^{th}$ gate lines GL1 to GLn, and a second driving unit sequentially apply the first to fifth control signals 710a to 710e to the first to fifth display planes P1 to P5. Further, the second driving unit may include a plurality of sub-driving units depending on the number of the display planes of the display panel 11. Assuming that k=5, the second driving unit includes first to fifth sub-driving units. The sub-driving units may control sending first to fifth control signals 710a to 710e to the first to fifth display planes P1 to P5, respectively.

FIGS. 9 to 11 are graphs for illustrating effects achieved by an LCD device according to an exemplary embodiment of the invention.

FIG. 9 is a graph showing the brightness of an LCD device at initial driving (810), the brightness of an LCD device with a control signal having the duty cycle of 100% (820), and the brightness of an LCD device with a control signal having the duty cycle of 20% (830) for comparison. The brightness of the LCD device with a control signal having the duty cycle of 100% (820) and the LCD device with a control signal having the duty cycle of 20% (830) was measured after annealing is performed for two hours at fifty degrees.

As seen from FIG. 9, the brightness of the LCD device with a control signal having the duty cycle of 100% (820) was lower than the brightness of the LCD device at initial driving (810) due to charge trap, i.e., an increase in the resistance component by a reduction in the amount of current. In contrast, it may be seen that the brightness of the LCD device with a control signal having the duty cycle of 20% (830) was rarely changed from the brightness of the LCD device at initial driving (810).

More detailed descriptions will be made with reference to FIGS. 10 and 11 for comparison.

FIG. 10 shows a white brightness at the initial driving of an LCD device with a control signal having the duty cycle of 100% (910a), a black brightness at the initial driving of the LCD device with a control signal having the duty cycle of 100% (910b), a white brightness at the initial driving of an LCD device with a control signal having the duty cycle of 100% (920a) after annealing was performed for forty hours at fifty degrees, and a black brightness at the initial driving of the LCD device with a control signal having the duty cycle of 100% (920b) after annealing was performed for forty hours at fifty degrees.

As seen from FIG. 10, both of the white brightness and the black brightness of the LCD device with a control signal having the duty cycle of 100% were lowered after the annealing. In particular, the white brightness was lowered more than the black brightness, possibly resulting in inverse afterimage.

FIG. 11 shows a white brightness at the initial driving of an LCD device with a control signal having the duty cycle of 25% (930a), a black brightness at the initial driving of the LCD device with a control signal having the duty cycle of 25% (930b), a white brightness at the initial driving of an LCD device with a control signal having the duty cycle of 25% (940a) after annealing was performed for forty hours at fifty degrees, and a black brightness at the initial driving of the LCD device with a control signal having the duty cycle of 25% (940b) after annealing was performed for forty hours at fifty degrees.

As seen from FIG. 11, the white brightness and the black brightness of the LCD device with a control signal having the duty cycle of 25% were rarely lowered after the annealing. In addition, there is no difference between white brightness and black brightness, inverse afterimage may be mitigated.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid-crystal display device comprising:
   a display panel connected to first to $n^{th}$ gate lines and first to $n^{th}$ control lines, wherein n is a natural number greater than one; and
   a gate driving unit which sequentially applies first to $n^{th}$ gate signals each having a first pulse width to the first to $n^{th}$ gate lines, respectively, for a unit frame,
   wherein the first to $n^{th}$ control lines are sorted into first to $k^{th}$ control line groups, wherein k is a natural number greater than one and less than n, the gate driving unit sequentially applies first to $k^{th}$ control signals each having a second pulse width to the first to $k^{th}$ control line groups, respectively, for the unit frame, and the first pulse width is smaller than the second pulse width, wherein the unit frame comprises first to $k^{th}$ sub-frames, and wherein a control signal applied during one of the first to $k^{th}$ sub-frame overlaps a control signal applied during a previous sub-frame of the sub-frame and/or a control signal applied during a subsequent sub-frame of the sub-frame.

2. The liquid-crystal display device of claim 1, wherein the first to $k^{th}$ control signals have a duty cycle ranging from about 20 percent to about 25 percent.

3. The liquid-crystal display device of claim 1, wherein each of the first to $k^{th}$ control signals overlaps another one.

4. The liquid-crystal display device of claim 1, wherein a pulse width of the first to $k^{th}$ control signals is greater than a pulse width of the first to $n^{th}$ gate signals.

5. The liquid-crystal display device of claim 1, further comprising:

a data driving unit connected to the display panel via first to $m^{th}$ data lines, wherein the first to $n^{th}$ gate lines comprises an $i^{th}$ gate line, and the first to $n^{th}$ control lines comprises an $i^{th}$ control line, wherein i is a natural number equal to or greater than one and equal to or less than n, and the first to $m^{th}$ data lines comprises a $j^{th}$ data line, wherein j is a natural number equal to or greater than one and equal to or less than m.

6. The liquid-crystal display device of claim 5, wherein the display panel comprises a pixel including first and second sub-pixels, and wherein the first sub-pixel comprises:

a first switching element, a gate electrode of the first switching element being connected to the $i^{th}$ gate line, one electrode of the first switching element being connected to the $j^{th}$ data line, and another electrode of the first switching element being connected to a first sub-pixel electrode, and the second sub-pixel comprises:

a second switching element, a gate electrode of the second switching element being connected to the $i^{th}$ gate line and one electrode of the second switching element being connected to the $j^{th}$ data line; and a third switching element, a gate electrode of the third switching element being connected to the $i^{th}$ control line, one electrode of the third switching element being connected to the another electrode of the first switching element, and another electrode of the third switching element being connected to a second sub-pixel electrode.

7. The liquid-crystal display device of claim 6, wherein an on-resistance of the third switching element ranges from about 0.1 mega-ohm to about 1,000 mega-ohms.

8. The liquid-crystal display device of claim 1, wherein the gate driving unit comprises first to $k^{th}$ sub-driving units, the first to $k^{th}$ sub-driving units sequentially apply the first to $k^{th}$ control signals to the first to $k^{th}$ control line groups, respectively.

9. A liquid-crystal display device comprising:

a data driving unit connected to a plurality of data lines disposed in a first direction;

a gate driving unit connected to a plurality of gate lines and a plurality of control lines disposed in a second direction different from the first direction; and a display panel comprising a plurality of pixels each including first and second sub-pixels, wherein the first sub-pixel comprises:

a first switching element, a gate electrode of the first switching element being connected to an $i^{th}$ gate line of the plurality of gate lines, one electrode of the first switching element being connected to a $j^{th}$ data line of the plurality of data lines, and another electrode of the first switching element being connected to a first sub-pixel electrode, wherein i and j are natural numbers equal to or greater than one, the second sub-pixel comprises a second switching element, a gate electrode of the second switching element being connected to the $i^{th}$ gate line and one electrode of the second switching element being connected to the $j^{th}$ data line, and a third switching element, a gate electrode of the third switching element being connected to an $i^{th}$ control line, one electrode of the third switching element being connected to the another electrode of the first switching element, and another electrode of the third switching element being connected to a second sub-pixel electrode, wherein a duty cycle of an $i^{th}$ control signal provided from the $i^{th}$ control line ranges from about 20 percent to about 50 percent, wherein a pulse width of an $i^{th}$ gate signal provided from the $i^{th}$ gate line is smaller than a pulse width of the $i^{th}$ control signal provided from the $i^{th}$ control line, wherein the unit frame comprises first to $k^{th}$ sub-frames, and wherein a control signal applied during one of the first to $k^{th}$ sub-frame overlaps a control signal applied during a previous sub-frame of the sub-frame and/or a control signal applied during a subsequent sub-frame of the sub-frame.

10. The liquid-crystal display device of claim 9, wherein the plurality of control lines is sorted into first to $k^{th}$ control line groups, wherein k is a natural number greater than one and less than n, the display panel comprises first to $k^{th}$ display plane each receiving a control signal from the first to $k^{th}$ control line groups, and the gate driving unit sequentially applies first to $k^{th}$ control signals to the first to the $k^{th}$ display plane, respectively.

11. The liquid-crystal display device of claim 10, wherein the gate driving unit sequentially applies the first to $k^{th}$ control signals to the first to $k^{th}$ display planes.

12. The liquid-crystal display device of claim 10, wherein each of the first to $k^{th}$ control signals overlaps another one.

13. The liquid-crystal display device of claim 10, wherein the first to $k^{th}$ control signals have the same pulse width.

14. The liquid-crystal display device of claim 9, wherein an on-resistance of the third switching element ranges from about 0.1 mega-ohm to about 1,000 mega-ohm.

15. A liquid-crystal display device comprising:

a gate driving unit connected to first to $n^{th}$ gate lines and first to $k^{th}$ control lines, wherein n is a natural number greater than one and k is a natural number greater than one and less than n;

a data driving unit connected to first to $m^{th}$ data lines; and a display panel comprising a plurality of pixels each connected to the respective first to $n^{th}$ gate lines, wherein the display panel is divided into first to k$^{th}$ display planes connected to the first to k$^{th}$ control lines, respectively, the gate driving unit sequentially applies gate signals to the first to n$^{th}$ gate lines, respectively, during a unit frame, and to sequentially apply control signals to the first to k$^{th}$ control lines, and a pulse width of each of the gate signals is smaller than a pulse width of each of the control signals, wherein the unit frame comprises first to kth sub-frames, and wherein a control signal applied during one of the first to kth sub-frame overlaps a control signal applied during a previous sub-frame of the sub-frame and/or a control signal applied during a subsequent sub-frame of the sub-frame.

16. The liquid-crystal display device of claim 15, wherein each of the first to k$^{th}$ control signals overlaps another one.

17. The liquid-crystal display device of claim 15, wherein the first to k$^{th}$ control signals have a duty cycle ranging from about 20 percent to about 25 percent.

18. The liquid-crystal display device of claim 15, wherein at least one of the plurality of pixels comprises first and second sub-pixels, wherein the first sub-pixel comprises
a first switching element, a gate electrode of the first switching element being connected to an i$^{th}$ gate line of the first to n$^{th}$ gate lines, one electrode of the first switching element being connected to a j$^{th}$ data line of the first to m$^{th}$ data lines, and another electrode of the first switching element being connected to a first sub-pixel electrode, where i is a natural number equal to or greater than one and equal to or less than n, and j is a natural number equal to or greater than one and equal to or less than m, and the second sub-pixel comprises
a second switching element, a gate electrode of the second switching element being connected to the i$^{th}$ gate line and one electrode of the second switching element being connected to the j$^{th}$ data line, and a third switching element, a gate electrode of the third switching element being connected to an i$^{th}$ control line, one electrode of the third switching element being connected to the another electrode of the first switching element, and another electrode of the third switching element being connected to a second sub-pixel electrode.

* * * * *